(12) United States Patent
Beton et al.

(10) Patent No.: US 7,895,305 B2
(45) Date of Patent: Feb. 22, 2011

(54) WEB-BASED MANAGEMENT ENGINE AND SYSTEM

(75) Inventors: Richard Beton, Romsey (GB); Robert Hancock, Southampton (GB)

(73) Assignee: Siemens Aktiengesellschaft, Munich (DE)

( * ) Notice: Subject to any disclaimer, the term of this patent is extended or adjusted under 35 U.S.C. 154(b) by 1215 days.

(21) Appl. No.: 10/416,006

(22) PCT Filed: Nov. 6, 2001

(86) PCT No.: PCT/GB01/04896

§ 371 (c)(1),
(2), (4) Date: Oct. 27, 2003

(87) PCT Pub. No.: WO02/39672

PCT Pub. Date: May 16, 2002

(65) Prior Publication Data

US 2004/0073645 A1    Apr. 15, 2004

(30) Foreign Application Priority Data

Nov. 7, 2000    (GB) .................... 0027106.4

(51) Int. Cl.
*G06F 15/173* (2006.01)
(52) U.S. Cl. .................... 709/223; 715/249
(58) Field of Classification Search ........... 709/223; 715/249
See application file for complete search history.

(56) References Cited

U.S. PATENT DOCUMENTS

| | | | | |
|---|---|---|---|---|
| 5,737,518 A | * | 4/1998 | Grover et al. .......... | 714/38 |
| 5,742,762 A | * | 4/1998 | Scholl et al. .......... | 709/200 |
| 5,996,010 A | * | 11/1999 | Leong et al. .......... | 709/223 |
| 6,003,077 A | * | 12/1999 | Bawden et al. .......... | 709/223 |
| 6,008,805 A | | 12/1999 | Land et al. | |
| 6,055,522 A | * | 4/2000 | Krishna et al. .......... | 715/517 |
| 6,067,558 A | * | 5/2000 | Wendt et al. .......... | 709/202 |

(Continued)

FOREIGN PATENT DOCUMENTS

EP    0908816 A2    4/1999

(Continued)

OTHER PUBLICATIONS

Landru, J. et al; "Monaco-Modular open network agent for control operations" Network Operations and Management Symposium, 1998, No. 98, IEEE New Orleans, LA, USA Feb. 15-20, 1998, New York, NY, USA, IEEE, US, Feb. 15, 1998, pp. 600-609, XP010267388.

(Continued)

*Primary Examiner*—Dohm Chankong
*Assistant Examiner*—Thomas J Dailey
(74) *Attorney, Agent, or Firm*—Crowell & Moring LLP

(57) ABSTRACT

A Web-based management engine is provided. The engine includes a Web page generator that generates Web pages based upon data relating to procedural steps for management of the at least one aspect of the behavior of the network entity. The engine also includes an interfacing component arranged to communicate data between a Web server and an SNMP agent in accordance with a predetermined data structure so as to manage the at least one aspect of the behavior of the network entity. Such a Web-based management engine obviates the complex to generate and inflexible template Web pages of known Web-based management systems.

17 Claims, 1 Drawing Sheet

U.S. PATENT DOCUMENTS

| | | | |
|---|---|---|---|
| 6,157,943 A | * | 12/2000 | Meyer .................... 709/203 |
| 6,301,613 B1 | * | 10/2001 | Ahlstrom et al. ............ 709/223 |
| 6,487,592 B1 | * | 11/2002 | Sawyer et al. .............. 709/223 |
| 2002/0035559 A1 | * | 3/2002 | Crowe et al. ................ 707/2 |

FOREIGN PATENT DOCUMENTS

| | | |
|---|---|---|
| EP | 0 963 076 A | 8/1999 |
| EP | 1041768 B1 | 6/2005 |
| GB | 2324896 A | 11/1998 |
| JP | 11017678 | 1/1999 |
| WO | WO 98/33302 | 7/1998 |
| WO | WO 00/30297 | 5/2000 |

OTHER PUBLICATIONS

Search Report for GB 0027106.4 dated Jul. 25, 2001.

* cited by examiner

WEB-BASED MANAGEMENT ENGINE AND SYSTEM

The present invention relates to a Web-based management engine and system of the type used to monitor and/or control the operation of a network entity, for example, a server or a network router.

An information technology network typically comprises a large number of interconnected entities (hereinafter referred to as "network entities"), for example, computers. It is necessary to manage the network entities in the network by monitoring and/or controlling operational parameters of the network entities.

In large networks, it is known to provide umbrella network management using an umbrella network management server operating in accordance with a Simple Network Management Protocol (SNMP). The network management server is capable of sending a request for information, or an instruction, to other network entities comprising SNMP agents in order to obtain information concerning the operation of the other network entities, or modify the operation thereof. However, umbrella network management is not cost-effective in smaller networks, because the network management server required to support the umbrella management is relatively expensive.

Under the SNMP, data relating to the behaviour of the network entities conform to complex data structures called Management Information Bases (MIBs). MIBs are used for monitoring and controlling operational parameters of network entities and includes operational parameters of connections between the network entities, for example, packet-related parameters, such as packet in/out parameters, octet parameters and frame parameters. A network entity supporting an SNMP may have one or more MIBs associated therewith. In order to obtain more specific information relating to a particular network entity, hardware manufacturers create specific, or enterprise, MIBs for the particular network entity.

In order to manage smaller networks in the light of the complexity of MIBs, Web-based management techniques have been developed, whereby Internet pages (also known as "Web pages") are used to obtain and manipulate information concerning the operation of the network entity. One known Web-based management technique comprises a network entity having a Web server in communication with an SNMP agent, the SNMP agent being capable of obtaining data relating to, and modifying data affecting, the behaviour of the network. The Web server is arranged to retrieve, from a store, template Web pages ("forms") corresponding to procedural steps which need to be taken in order to obtain, and/or modify, data relating to the behaviour of the network entity. Data obtained or modified by means of the Web server and the template Web pages are communicated between the Web server and the SNMP agent in the MIB format. Part of the building process of the software for the network entity includes the provision of the template Web pages ("forms") to allow a network administrator to execute procedural steps necessary to obtain data relating to the behaviour of the network entity, and/or modify the behaviour of the network entity. However, the template Web pages ("forms")) have to be custom-written manually for different network entities, since as mentioned above different network entities have different, specific, MIBs associated therewith. Additionally, due to the complexity of the MIBs, a considerable amount of time and effort is required to write the template Web pages ("forms").

It is therefore an object of the present invention to simplify management of network entities in a network using a Web based management technique.

According to the present invention, there is provided a Web-based management engine for a network entity, which comprises an intelligent agent for obtaining information about at least one operational parameter of the network entity and/or modifying the behaviour of the network entity, the intelligent agent being arranged to interact with the network entity in accordance with a predetermined data structure; a data store arranged to store data relating to a procedure for managing the at least one operational parameter of the network entity; a Web server for providing an interactive environment to manage the at least one operational parameter of the network entity using the Web pages generated by the Web page generator, the Web page server being adapted to be capable of generating a set of linked Web pages in response to a request to carry out a procedure, the set of linked Web pages being based upon the data stored in the data store and constituting the procedure to manage the at least one operational parameter of the network entity, and an interface arranged to communicate data between the Web server and the intelligent agent in accordance with the predetermined data structure.

According to an embodiment of the invention, the data relating to the procedure for managing the at least one operational parameter of the network entity includes data relating to rules to be observed in relation to the operational procedure, and the Web-based management engine, and further comprising means for verifying the rules relating to the procedure.

The Web-based management engine may further comprise means for generating at least one variant Web page corresponding to, but in a different natural language to that of, at least one of the set of linked Web pages.

The intelligent agent may be an SNMP agent.

The predetermined data structure may be an MIB.

In an embodiment of the invention, upon rejection of the data by the intelligent agent, data submitted immediately previously is resubmitted to the intelligent agent.

The present invention also provides a Web-based management system comprising the Web-based management engine as described.

Such a system may further comprise means for compiling a non machine-readable management procedure into machine-readable data.

Such a system may further comprise means for verifying that the non-machine readable management procedure can conform, when compiled, to the predetermined data structure.

The machine-readable data may be a binary format file.

The machine-readable data may be stored in a text file.

The machine readable data may be stored in a database file.

Any such system may further comprise a Web browser.

The present invention also provides a method of manufacturing a Web based management engine. The method comprises the steps of: translating management procedures into a machine readable format, storing the translated management procedures in a machine readable file, the machine readable file corresponding to at least one Web page, and compiling a Web server and translation means to form an adapted Web server, the adapted Web server being capable of translating the content of the machine readable file into at least one Web page for transmission by the adapted Web server.

It is thus possible to provide a Web-based management engine and system which permits user-friendly management of a network whilst providing automatic generation of Web pages or forms in, for example, Hyper Text Markup Language (HIML) or Extensible Meta Language (XML) which have been automatically pre-validated. Consequently, the present invention obviates the expenditure of large amounts of time and effort in the generation and de-bugging of Web pages ("forms") for network management. Also, rule verification which would otherwise be much more difficult to implement with known Web-based management techniques is possible.

At least one embodiment of the invention will now be described, by way of example, with reference to the accompanying drawings, in which.

Figure 1:
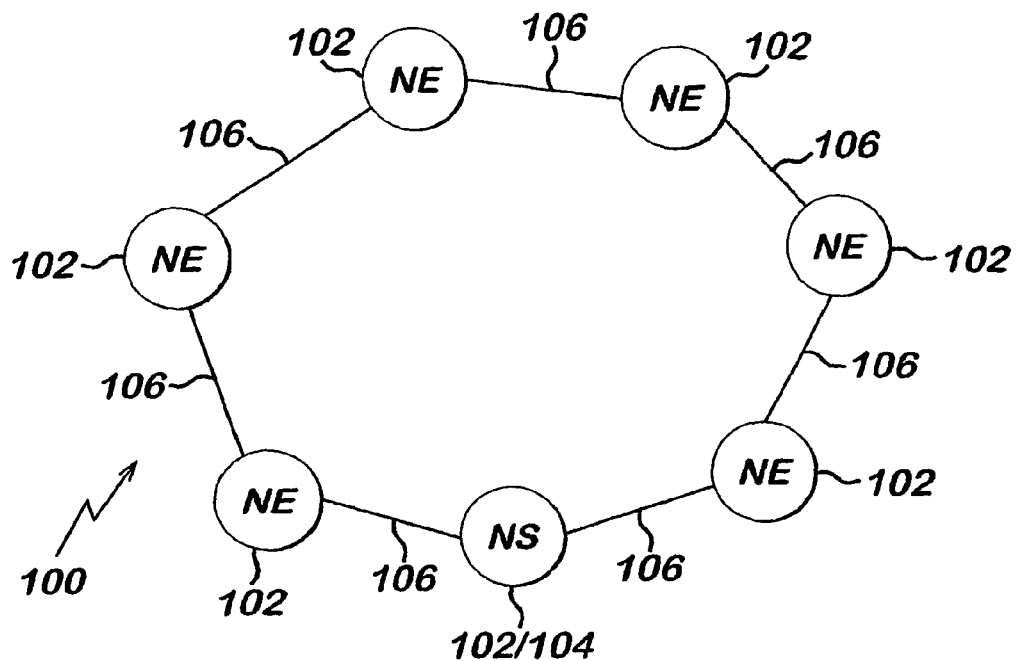
FIG. 1 is a schematic illustration of an information technology network for use with an embodiment of the invention.

Referring to FIG. 1, an information technology network, for example, a computer network 100, comprises a plurality of network entities 102 and a network server 104 interconnected by network interconnect 106. In this example, the network interconnects 106 are cables, such as Ethernet cables known in the art, but other forms of interconnection are possible, such as wireless interconnections. For the purposes of the present invention, a network entity is defined as any device which is capable of being interconnected by network interconnects to form part of an information technology network, for example, a terminal, a server or a router.

Figure 2:
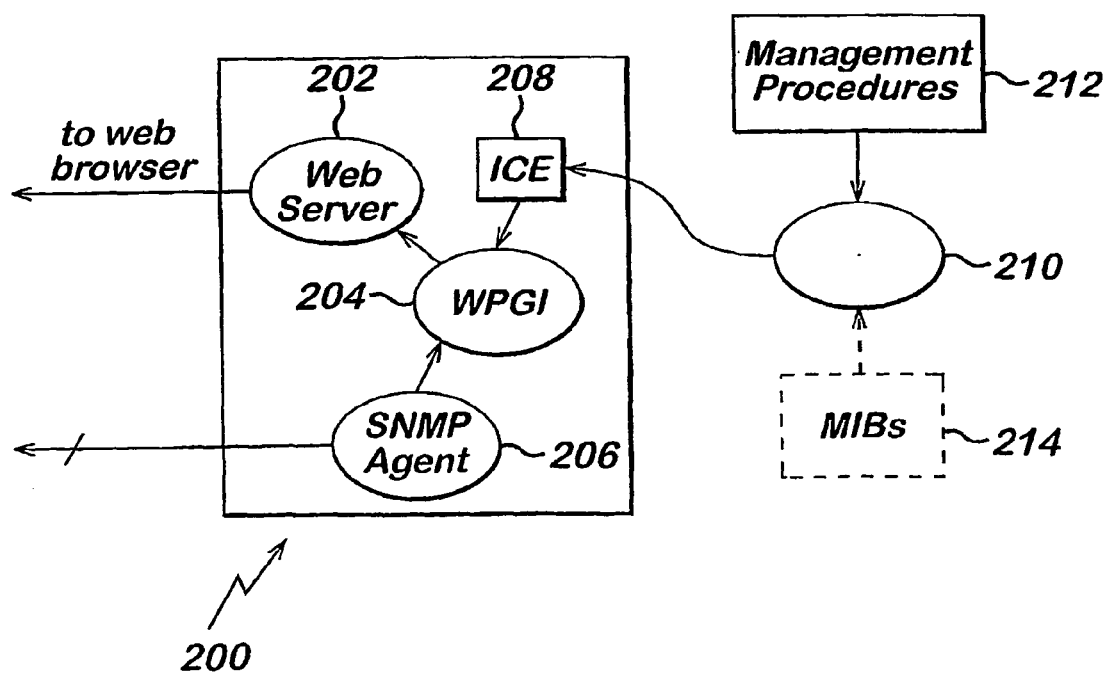
FIG. 2 is a schematic diagram of a web-based management engine network entity constituting an embodiment of the invention.

A Web-based management engine 200 (FIG. 2) for a network entity 102 comprises a Web server 202 in communication with a Web page generator and interface (WPGI) unit 204, the WPGI unit 204 being in communication with an SNMP (Simple Network Management Protocol) agent 206 and coupled to a storage unit, such as an Electronic Erasable Programmable Read Only Memory (EEPROM) 208. The EEPROM 208 stores a data file, for example, an ICE file, the ICE file being a binary format file containing information relating to procedural steps which have to be taken in order to manage at least one aspect of the behaviour of the network entity 102.

The ICE files are generated by an ICE generation module 210. As part of the software building process, the ICE generation module 210 receives text-based details of procedural steps 212 necessary to manage the network entity 102. The ICE generation unit 210 performs static analysis on the procedural steps 212 before compiling this information down into the binary format, or ICE, files for use by the WPGI unit 204. The binary format of the ICE files comprises a tree-structured syntax for the Web server 202 to follow. ICE files can be implemented in a number of ways. However, in this example, the binary trees of the ICE files are interpreted in a manner similar to that of an abstract tree syntax by the Mice programming language. In order to perform the static analysis on the text-based details of the procedural steps 212, the ICE generation module 210 has a database 214 of available MIBs (Management Information Bases); the static analysis takes place off-line, i.e. prior to starting the Web server 202, and is a comparison of the text-based details of the procedural steps 212 with the database 214 of MIBs in order to ensure that the text-based details of the procedural steps 212 conform to MIBs structures. For example, in can be necessary to prevent attempts to modify a numeric field with text data. Typically, the ICE files are loaded into the EEPROM 208 during the manufacture of the network entity 102.

Although in the above example the Web-based management engine is located within the network entity 102, it should be appreciated that this is not essential and that the Web-based management engine can be located remotely from the network entity 102. Also, it is conceivable that the WPGI unit 204 can be form part of the Web server 202 as opposed to being a separate independent entity.

In a first example of operation of the above apparatus, one of the network entities 102 is a server. A network administrator wanting to modify an operational parameter of the server, for example the name of the server, navigates through a management Web-site, or collection of linked forms until the desired form is found for modification of the server name.

The forms (not shown) through which the network administrator navigates are generated by the WPGI unit 204 using data stored in the ICE file relating to the procedural steps required to make the modification. Once the network administrator has modified an appropriate field, the data obtained by means of the form is communicated to the WPGI unit 204 which generates data conforming to the MIBs structure (hereinafter referred to as MIBs Format Management data, or MFM data) and communicates the MFM data to the SNMP agent 206. Thereafter, the SNMP agent 206 uses the MFM data to modify the name of the server according to an appropriate SNMP procedure known in the art.

In a second example of the operation of the above apparatus, one of the network entities 102 is a router. The network administrator wanting to modify a mapping in the router, for example, a mapping of an ingress port to an egress port in the router, navigates through the management Web-site, or collection of linked forms until the desired form is found for modification of the router mapping.

The forms through which the network administrator navigates are again generated by the WPGI unit 204 using data stored in the ICE file. Once the network administrator has modified an appropriate field, the data collected by means of the form is communicated to the WPGI unit 204 which generates data conforming to the MIBs structure, i.e. MFM data, and communicates the MFM data to the SNMP agent 206. Thereafter, the SNMP agent 206 uses the MFM data to modify the router mapping according to another appropriate SNMP procedure known in the art.

In a third example of the operation of the above apparatus, the text-based details of procedural steps 212 include rules relating to the operational parameters of a network entity 102, for example, the router described in the second example of the operation of the above apparatus. At the time of building the software for the router, the manufacturer specifies that if the network administrator configures the router to transmit more than a predetermined number of packets within a specified time period, then the bit rate of the router cannot exceed a specified bit rate. This rule is incorporated into the ICE file generated by the ICE generation module 210 and implemented by the WPGI unit 204 when the network administrator navigates to an appropriate form for modifying the packet parameters. Consequently, the WPGI unit 204 in conjunction with the Web server 202 will not permit the network administrator to select a bit rate which exceeds the specified bit rate in the light of the number of packets to be transmitted.

In an alternative example, the WPGI unit 204 in conjunction with the Web server 202 can permit the network administrator to set whatever values the network administrator so desires. Subsequently, the WPGI unit 204 submits the MFM data corresponding to the values of the operational parameters set by the network administrator to the SNMP agent 206, the SNMP agent 206 consequently rejecting the operational parameters set if the router cannot support such values. If the router rejects the values set, the WPGI unit 204 then resets the modified operational parameters back to their previous values and transmits MFM data to the SNMP agent, the MFM data corresponding to the reset values. The fact that the operational values set by the network administrator cannot be supported by the router is communicated back to the network administrator in a manner specified by the text-based details of the procedural step, for example, a different Web page.

As a further alternative example, the Web browser of the network administrator can use JavaScript routines to verify that the rules relating to the operational parameters of the network entity 102.

In another example, a three tiered scheme for verifying the observance of rules relating to the operational parameters of the network entity 102 is implemented: a first check is carried out by the Web browser, a second check is carried out by the WPGI unit 204, and a third check is carried out by the SNMP agent 206.

In any of the above examples of operation of the apparatus, a privilege system may be incorporated, whereby the forms generated by the WPGI unit 204 and presented by the Web server 202 require the network administrator to provide a password in order to obtain information relating to, and/or modify, an operational parameter of the network entity.

Although, in the above examples, a single form is completed by a network administrator, it is conceivable that more than one such form is completed.

In summary, the above examples show how a network administrator can define and/or make enquiries as to operational parameters of a network entity. The Web-based management engine generates data conforming to a predefined data structure, such as MIBs, in order to obtain the functionality desired by the network administrator and/or information. The functionality desired by the network administrator, and/or information is obtained, via a management protocol agent, such as an SNMP agent.

The invention claimed is:

1. A Web-based management engine for a network entity, comprising:
   an intelligent agent that obtains information about at least one operational parameter of the network entity and/or modifies the behavior of the network entity, the intelligent agent interacting with the network entity in accordance with a predetermined data structure;
   a data store storing data relating to a procedure for managing the at least one operational parameter of the network entity;
   a Web server that provides an interactive environment to manage the at least one operational parameter of the network entity, and
   an interface that communicates values of the at least one operational parameter between the Web server and the intelligent agent in accordance with the predetermined data structure,
   wherein the Web server provides the interactive environment using the Web pages generated by a Web page generator, the Web page generator that generates a set of linked Web pages in response to a request to carry out a procedure, wherein each Web page of the set of linked Web pages being based upon the data stored in the data store and corresponding to at least one step in the procedure to manage the at least one operational parameter of the network entity,
   wherein the interface uses the stored data relating to a procedure for managing the at least one operational parameter of the network entity to generate a determination result indicating whether information retrieved using a form provided on the set of linked Web pages conforms to a rule relating to the procedure to manage the at least one operational parameter of the network entity, and wherein the interface communicates values to the intelligent agent based on the information retrieved from the form in response to the determination result indicating conformance.

2. The Web-based management engine as claimed in claim 1, wherein the data relating to the procedure for managing the at least one operational parameter of the network entity is a file in a binary format that includes a tree-structured syntax used when generating the set of linked Web pages.

3. The Web-based management engine as claimed in claim 2, wherein the data relating to the procedure for managing the at least one operational parameter of the network entity includes data relating to rules to be observed in relation to the operational procedure, and the Web-based management engine, and further comprising a verification component that verifies the rules relating to the procedure.

4. The Web-based management engine as claimed in claim 2, wherein at least one variant Web page is generated that corresponds to, but in a different natural language to that of, at least one of the set of linked Web pages.

5. The Web-based management engine as claimed in claim 2, wherein the intelligent agent is an SNMP agent.

6. The Web-based management engine as claimed in claim 2, wherein the predetermined data structure is an MIB.

7. The Web-based management engine as claimed in claim 2, wherein upon rejection of a communicated value for the at least one operational parameter of the network entity by the intelligent agent, the interface sends information to the intelligent agent to reset a value of the at least one operational parameter of the network entity to a previous value.

8. A Web-based management system comprising a Web-based management engine comprising:
   an intelligent agent that obtains information about at least one operational parameter of the network entity and/or modifies the behavior of the network entity, the intelligent agent interacting with the network entity in accordance with a predetermined data structure;
   a data store storing data relating to a procedure for managing the at least one operational parameter of the network entity;
   a Web server that provides an interactive environment to manage the at least one operational parameter of the network entity, and
   an interface that communicates values of the at least one operational parameter between the Web server and the intelligent agent in accordance with the predetermined data structure,
   wherein the Web server provides the interactive environment using the Web pages generated by a Web page generator, the Web page generator generating a set of linked Web pages in response to a request to carry out a procedure, wherein each Web page of the set of linked Web pages being based upon the data stored in the data store and corresponding to at least one step in the procedure to manage the at least one operational parameter of the network entity, and
   wherein the interface uses the stored data relating to the procedure for managing the at least one operational parameter of the network entity to generate a determination result indicating whether values to be communicated to the intelligent agent from the Web server conform to a rule relating to the procedure for managing the at least one operational parameter of the network entity, and
   wherein the interface communicates values from the Web server to the intelligent agent in response to the determination result indicating conformance.

9. The Web-based management system as claimed in claim 8, wherein the data relating to the procedure for managing the at least one operational parameter of the network entity is a file in a binary format that includes a tree-structured syntax used when generating the set of linked Web pages.

10. The system as claimed in claim 9, further comprising a compiler that performs a static analysis on a text-based description of procedural steps of a management procedure that includes comparing the text-based description of procedural steps to a database of predetermined structures for managing the at least one operational parameter of the network to verify that the procedural steps of the management procedures conform to the predetermined structures, and compiles the verified text-based description of procedural steps of the management procedure into machine-readable data.

11. The system as claimed in claim 8, wherein the data relating to a procedure for managing the at least one operational parameter of the network entity is stored in a binary format file.

12. The system as claimed in claim 8, wherein the data relating to a procedure for managing the at least one operational parameter of the network entity is stored in a text file.

13. The system as claimed in claim 8, wherein the data relating to a procedure for managing the at least one operational parameter of the network entity is stored in a database file.

14. The system as claimed in claim 9, further comprising a Web browser.

15. A method of manufacturing a Web based management engine, the method comprising the steps of:

performing a static analysis by retrieving a predetermined data structure for managing at least one operational parameter of a network entity and comparing a text-based description of procedural steps of management procedures for the network entity to the predetermined data structure to verify that the procedural steps conform to the predetermined data structure, translating the verified text-based description of procedural steps of the management procedures into a machine readable format, storing the translated management procedures in a machine readable file, the machine readable file corresponding to at least one Web page, and combining a Web server and web page generator to form an adapted Web server that translates the content of the machine readable file into at least one Web page for transmission by the adapted Web server, wherein the web page generator generates a set of linked web pages in response to a request to carry out a procedure, wherein each Web page of the set of linked web pages being based upon the data stored in a data store and corresponding to at least one step in a procedure to manage at least one operational parameter of a network entity.

16. The method of claim 15, wherein the machine readable file is in a binary format that includes a tree-structured syntax used when generating the set of linked web pages.

17. The method of claim 15, wherein the predetermined data structure is an MIB.

* * * * *